US010363731B2

(12) United States Patent
Biegelsen et al.

(10) Patent No.: US 10,363,731 B2
(45) Date of Patent: Jul. 30, 2019

(54) EJECTOR DEVICE

(71) Applicant: Palo Alto Research Center Incorporated, Palo Alto, CA (US)

(72) Inventors: David K. Biegelsen, Portola Valley, CA (US); Timothy D. Stowe, Alameda, CA (US); Mandana Veiseh, Palo Alto, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1039 days.

(21) Appl. No.: 14/576,159

(22) Filed: Dec. 18, 2014

(65) Prior Publication Data

US 2016/0176110 A1 Jun. 23, 2016

(51) Int. Cl.
*B29C 67/00* (2017.01)
*B33Y 30/00* (2015.01)
*B29C 64/112* (2017.01)

(52) U.S. Cl.
CPC ............ *B33Y 30/00* (2014.12); *B29C 64/112* (2017.08)

(58) Field of Classification Search
CPC .. B41J 2/1412; B41J 2/14129; B41J 2/14008; B41J 2/14104; B41J 2002/14266; B41J 2/1408; B41J 2/1612; B29C 64/112
USPC .................................. 347/20, 40, 55, 56, 87
See application file for complete search history.

(56) References Cited

U.S. PATENT DOCUMENTS

| 5,751,315 | A | * | 5/1998 | Burke | B41J 2/1404 347/62 |
| 6,022,482 | A | * | 2/2000 | Chen | B41J 2/14072 216/27 |
| 6,234,609 | B1 | | 5/2001 | Silverbrook | |
| 6,464,336 | B1 | | 10/2002 | Sharma et al. | |
| 6,718,764 | B1 | | 4/2004 | Sarkar et al. | |
| 6,833,112 | B2 | | 12/2004 | Hoummady | |
| 6,895,645 | B2 | | 5/2005 | Xu et al. | |
| 7,084,554 | B2 | | 8/2006 | Xu et al. | |
| 7,549,728 | B2 | | 6/2009 | Silverbrook | |
| 2004/0164649 | A1 | | 8/2004 | Xu et al. | |
| 2008/0096296 | A1 | * | 4/2008 | Jung | B41J 2/14 438/21 |

(Continued)

OTHER PUBLICATIONS

Mar. 2012, Gurkan et al., "Emerging Technologies for Assembly of Microscale Hydrogels", Adv. Healthc. Mater., vol. 1 (2), Mar. 2012, pp. 149-158.

(Continued)

*Primary Examiner* — Joseph S Del Sole
*Assistant Examiner* — Mohamed K Ahmed Ali
(74) *Attorney, Agent, or Firm* — Hollingsworth Davis, LLC

(57) ABSTRACT

An ejector device that includes one or more ejectors comprises an ejector layer that spans at least one hollow area. The ejector layer has a first surface and an opposing second surface arranged to receive a viscous material with viscosity between 20 and 50,000 centipoise. The ejector layer includes a radiation absorber material configured to thermally expand without phase transition in response to heating by activation radiation transmitted to the first surface. Thermal expansion of the ejector layer causes displacement of the ejector layer and ejection of the material from the second surface of the ejector layer.

16 Claims, 19 Drawing Sheets

(56) References Cited

U.S. PATENT DOCUMENTS

2014/0093932 A1 4/2014 Murphy et al.
2015/0224784 A1* 8/2015 Hong .................. B41J 2/16535
  347/47

OTHER PUBLICATIONS

Mar. 2006, Serra et al., "Laser-induced forward Transfer: a Direct-writing Technique for Biosensors Preparation", Journal of Laser Micro Nanoengineering, vol. 1 (3), Mar. 2006, pp. 236-242.

* cited by examiner

EJECTOR DEVICE

TECHNICAL FIELD

This disclosure relates generally to ejectors for printing, as well as systems that incorporate such ejectors and methods pertaining to such ejectors.

BACKGROUND

Three dimensional (3D) printing is a process of making three dimensional solid objects by ejecting ink toward a print surface. Typically an additive process is used wherein layers of the object being formed are successively printed and fused. The printing of 3D objects has the potential to significantly lower risks and costs of manufacturing. For example, using 3D printing, prototyping expenses can be significantly reduced and mass manufacturing of identical items is not necessary to recoup initial tooling startup investment. One interesting aspect of 3D printing is the formation of living tissue structures and organs using bio-inks.

Some 3D printed objects involve the printing of viscous inks. These viscous inks, which include bio-inks, require ejectors capable of efficiently printing viscous materials. In the case of bio-inks, the printing process needs to avoid shearing of cells and/or extracellular material.

SUMMARY

Various embodiments described herein involve systems, devices, and methods for printing of high viscosity inks. Some embodiments involve an ejector device configured to eject material having viscosity between 20 and 50,000 centipoise. The ejector device includes one or more ejectors comprising an ejector layer that spans a hollow area. The ejector layer includes a first surface and an opposing second surface arranged to receive the viscous material. The ejector layer includes a radiation absorber material configured to thermally expand without phase transition in response to heating by activation radiation transmitted to the first surface. The thermal expansion of the ejector layer causes displacement of the ejector layer and ejection of the material from the second surface of the ejector layer.

The ejector device may include one or more ejectors arranged in an array. For example, the array may include one or more hollow mesas or one or more hollow islands. In some embodiments, the ejector device includes a substrate, one or more mesas disposed on the substrate where at least one of the mesas is an ejector mesa comprising the ejector layer that spans the hollow area, and at least one channel disposed adjacent to at least one of the one or more mesas, the channel being configured to carry the material to the ejectors. To facilitate activation radiation reaching the ejector layer, the substrate may comprise a material that is transparent at wavelengths of the activation radiation and/or one or more vias through the substrate.

In some embodiments, the ejectors comprise one or more hollow mesas, each of the one or more hollow mesas disposed between solid mesas. The ejector layer may include at least one layer that conforms to the channel and walls of the solid mesas. A thermally conductive layer is disposed at least partially along the channel. In some implementations, the substrate can include vias that fluidically couple the channel to a source of the ejectable material. An aperture layer may be disposed at least partially over the channel.

The ejector layer may include multiple layers. In some configurations the multiple layers include a first layer having a first coefficient of thermal expansion, $CTE_1$, and a second layer having a second coefficient of thermal expansion, $CTE_2$, wherein $CTE_2 > CTE_1$. The absorption of the activation radiation in the second layer causes the ejector layer to buckle in some embodiments. For example, suitable materials for the second layer may comprise amorphous Ge or amorphous Si. In some configurations, the ejector layer may include a layer that comprises a binding material configured to provide a predetermined surface energy.

The ejector layer may be relatively flat or may be curved. For example, in some embodiments a portion of the ejector layer over the hollow area is convex and bends toward the substrate. In some implementations, the ejector layer can be formed so that it has a built in stress gradient.

Some embodiments involve a system that includes an ejector device as discussed above in addition to a radiation source configured to provide the activation radiation to the one or more ejectors, a fluidics subsystem configured to carry the material to the at least one channel, a transport subsystem configured to provide relative movement between the ejector device and the media surface.

Some embodiments are directed to a method of ejecting material. A droplet of viscous material is disposed on an ejector, the ejector including an ejector layer having a first surface and an opposing second surface arranged to receive the droplet of material. The ejector layer is heated by activation radiation. The heating causes the ejector layer to thermally expand without phase transition. In response to the thermal expansion of the ejector layer, the material is ejected from the second surface.

Some embodiments involve a method of making an ejector device. A base material is deposited on a substrate and is patterned to form one or more sacrificial regions. At least the sacrificial region is conformally coated with an ejector layer. The sacrificial region is etched to form an ejector comprising the ejector layer spanning a hollow area. The ejector layer is configured to thermally expand without phase transition in response to heating by activation radiation. The thermal expansion of the ejector layer causes ejection of a droplet from the ejector layer.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DESCRIPTION

There are many applications in which inks having high viscosity, e.g., between about 20 centipoise and 50,000 centipoise need to be patterned with precision, optionally in a 3D configuration. Although there are many such applications, one of particular interest is the patterning of "bio-inks" comprising biologically active components (such as live cells, extracellular matrix materials, etc.). Embodiments disclosed herein relate to devices, systems, and methods for printing by ejecting droplets of ejectable material, including high viscosity inks. The approaches discussed can be particularly useful for 3D printing of bio-inks with reduced shearing of cells and/or extracellular materials.

Figure 1A:
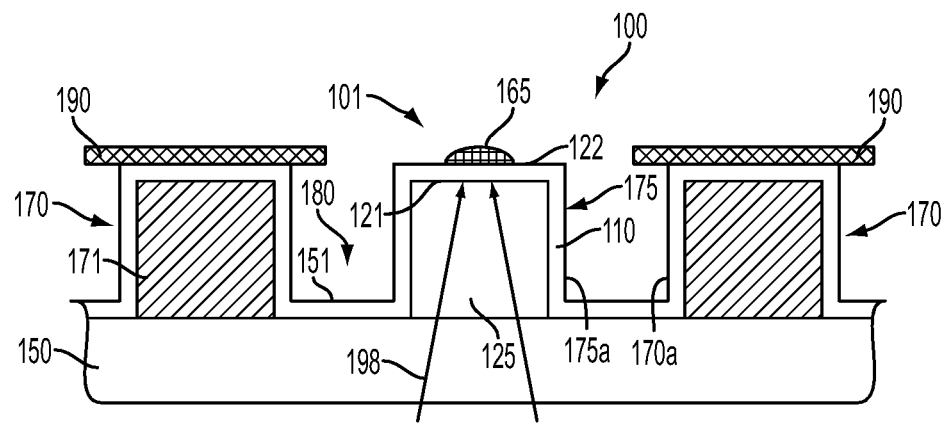
FIG. 1A is a cross sectional view of an ejector device taken through plane A-A' in accordance with some embodiments.
Figure 1B:
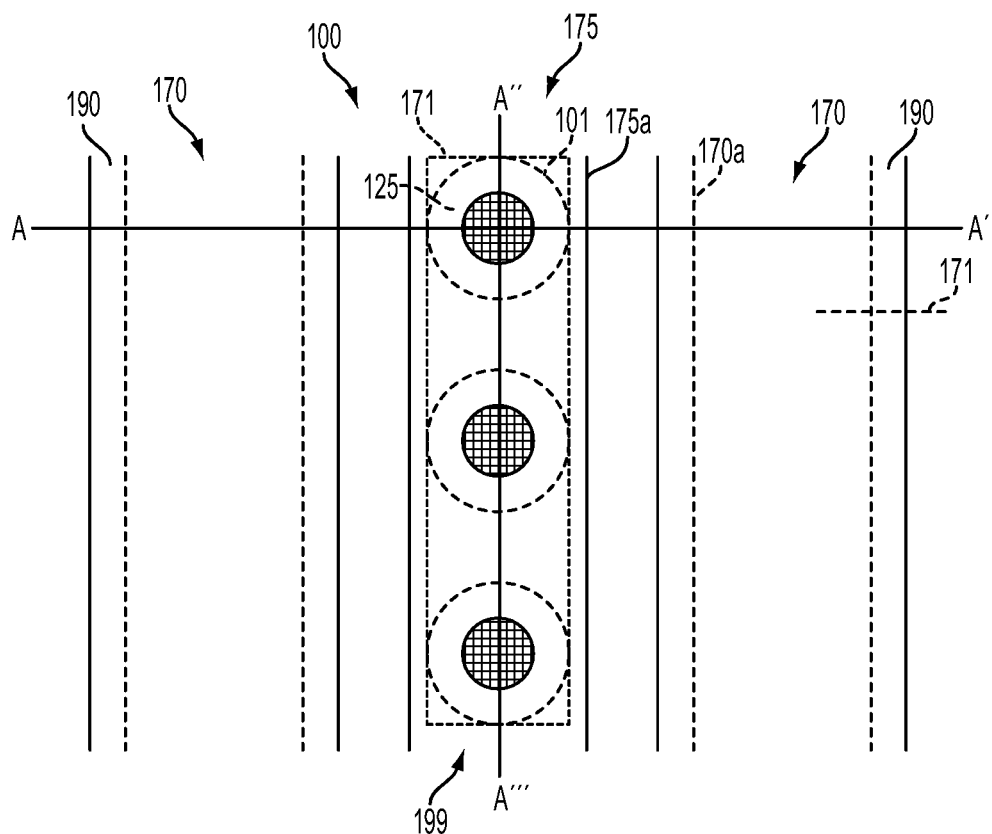
FIG. 1B is a plan view of the ejector device of FIG. 1A.

FIGS. 1A and 1B respectively show cross sectional (through plane A-A' of FIG. 1B) and plan views of an ejector device 100 that includes one or more ejectors 101. As best seen in FIG. 1B, the ejectors 101 in the illustrated embodiment are arranged in a row 199 forming a one dimensional ejector array. Alternatively, in some embodiments the ejectors can be arranged in multiple rows and/or in other patterns that form a two dimensional ejector device.

As best seen in FIG. 1A, each ejector 101 comprises an area of an ejector layer 110 that is suspended over a hollow area 125 located between the ejector layer 110 and a substrate 150 that forms a hollow or partially hollow ejector mesa 175. As discussed in more detail below, the suspended ejector layer 110 of the ejector mesa 175 can be formed by conformally coating the ejector layer 110 over sacrificial support material and then etching some, most, or all of the sacrificial support material.

Figure 1C:
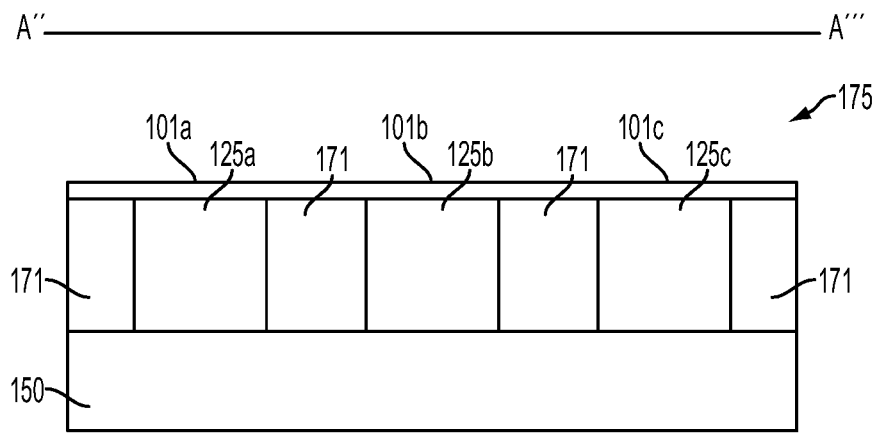
FIGS. 1C and 1D are alternative configurations of an ejector device taken through plane A"-A"' in accordance with some embodiments.
Figure 1D:
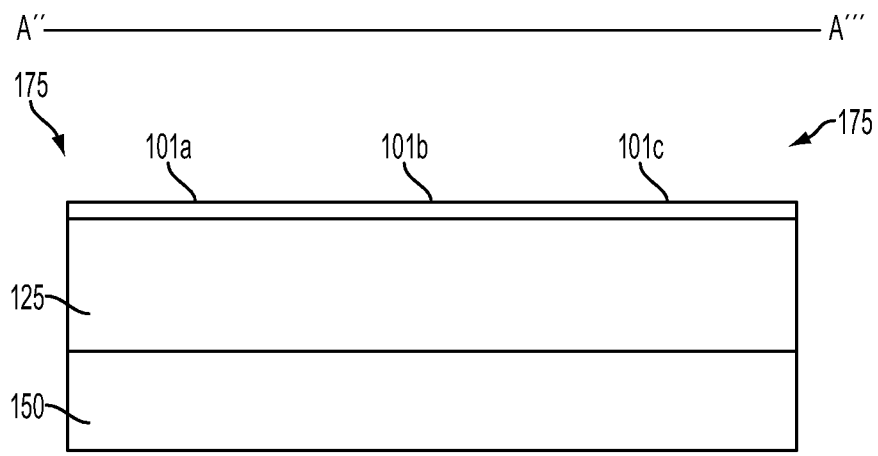

In some embodiments, as shown in FIG. 1D in a cross section taken through plane A"-A''' of FIG. 1B, the sacrificial support material used to form the hollow area 125 may be substantially or completely etched away. In these embodiments, the hollow area 125 is an elongated area that extends substantially the entire length of the ejector mesa 175. The ejectors 101a, 101b, 101c are localized regions along the ejector layer 110.

In some embodiments, as shown in FIG. 1C in a cross section taken through plane A"-A''', portions of the support material 171 may remain after etching. The ejector mesa may include multiple hollow areas 125a-c, each hollow area 125a-c being surrounded by support material 171. In the embodiment illustrated in FIG. 1C, one hollow area corresponds to one ejector 101a-c.

The ejector layer 110 may be a single layer unimorph ejector layer or a multimorph ejector layer comprising multiple layers. The ejector layer 110 has a first surface 121 that faces the substrate 150 and an opposing second surface 122 arranged to receive ejectable material 165, e.g., a viscous ink such as a bio-ink. At least one of the layers of the ejector layer 110 is configured to thermally expand without a phase transition in response to heating by activation radiation 198, e.g., pulsed laser light. Thus, the ejection of the ejectable material 165 from the ejector layer 110 substantially occurs due to thermal expansion of the ejector layer, and does not substantially occur due to phase transition of the ejector layer from one form of matter to another form of matter as in the laser induced forward transfer (LIFT). The LIFT printing technique relies on phase conversion of the ejector layer from liquid or gel form to gaseous form. In the embodiments described herein, thermal expansion of at least one layer of the ejector layer 110 causes the ejector layer to deflect with sufficient acceleration to eject the ejectable material 165 from the second surface 122 of the ejector layer 110.

In some configurations, the ejector device 100 may include mesas 170 disposed on one or both sides of the ejector mesa 175. In the illustrated embodiment, the ejector device 100 includes one or more channels 180 formed by the mesa walls 170a, 175a and the region 151 between the mesa walls 170a, 175a. The mesas 170 can comprise the same material as the sacrificial material used to make the ejector mesa 175 and may not have hollow areas. One or more layers of ejector layer 110 may conformally coat the mesas 170 and regions 151 of channel 180.

Channels 180 may be arranged to carry the ejectable material to the ejectors 101. To fill the ejectors, the ejectable material can be caused to flow through the channels 180 and over the second surface 122 of the ejector layer 110 and subsequently to recede, leaving droplets 165 of the ejectable material on the second surface 122. For example, the ejectable material may be pressurized, causing the ejectable material to flow over the second surface 122, and then depressurized, causing the ejectable material to recede. An aperture structure 190 that at least partially covers the channels 180 may be used to facilitate retention of the ejectable material in the channels 180 during the filling process and reduce evaporation or contamination of the ejectable material during use.

Figure 2:
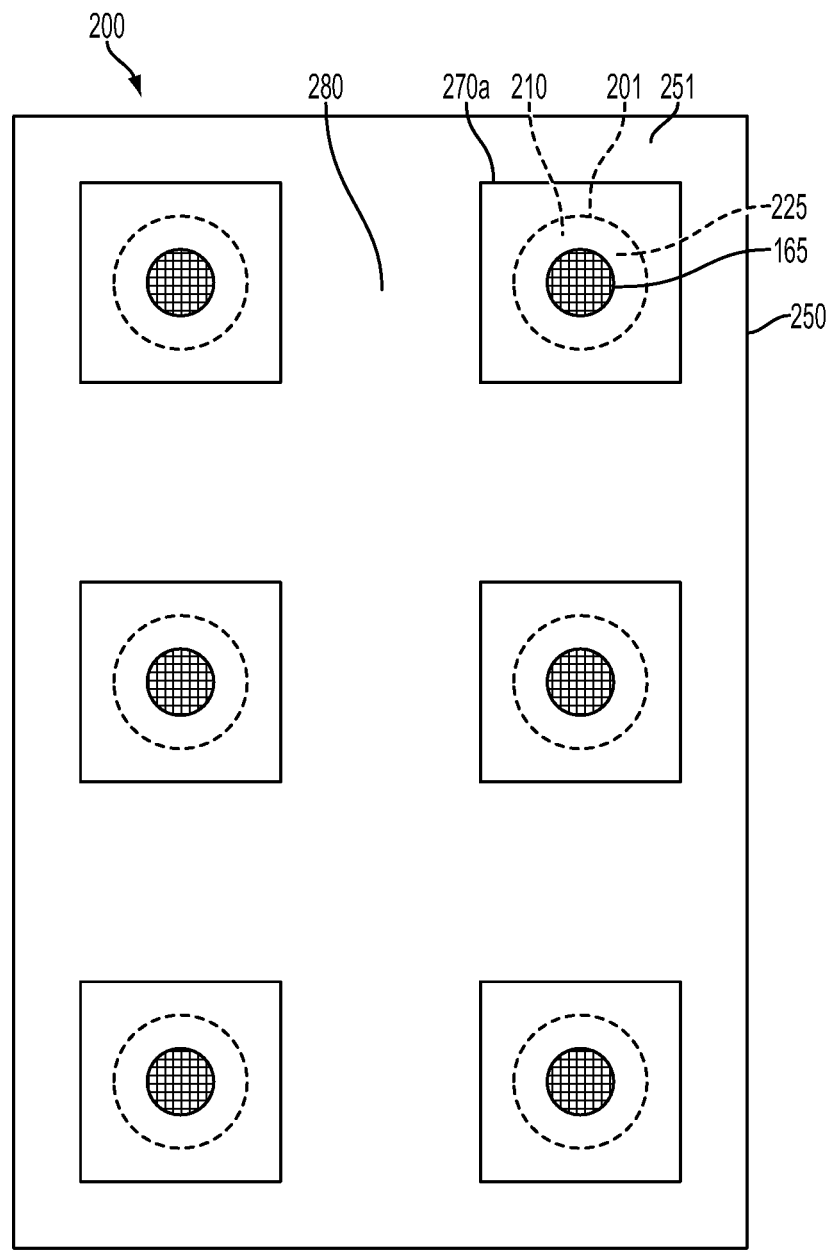
FIG. 2 is a plan view of an ejector device that includes a two dimensional array of island ejectors.

The implementations illustrated in FIGS. 1A through 1D comprise elongated mesas and ejector mesas 170, 175, wherein ejector mesa 175 includes one or more hollow areas 125 associated with multiple ejectors 101. Alternatively, in some configurations, an ejector device 200 may include a one or two dimensional array of islands 270, as illustrated in plan view in FIG. 2. Some or all of the islands 270 include ejectors 201 associated with hollow areas 225 surrounded by island support material 271. The ejector layer 210 is suspended across the hollow areas 225 and one or more ejector layers may be disposed over the island walls and/or over the surface of the substrate 250 in the region 251 between the islands 270. The island walls 270a and surface 251 of the substrate 250 form channels 280 through which the ejectable material can flow to form droplets 165 preferentially on the ejectors 201.

Figure 3A:
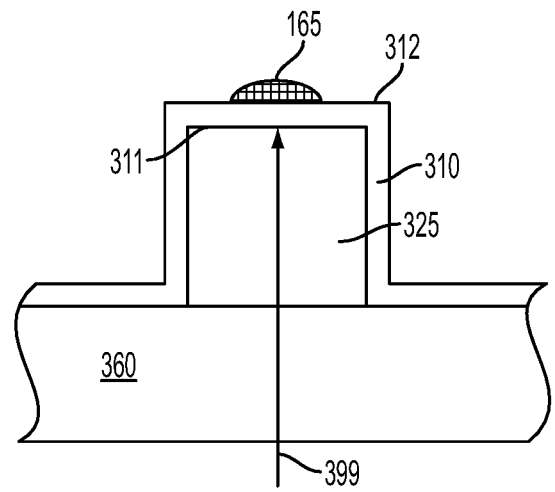
FIGS. 3A-3C illustrate various ways the ejector layer can be heated by a activation radiation.
Figure 3B:
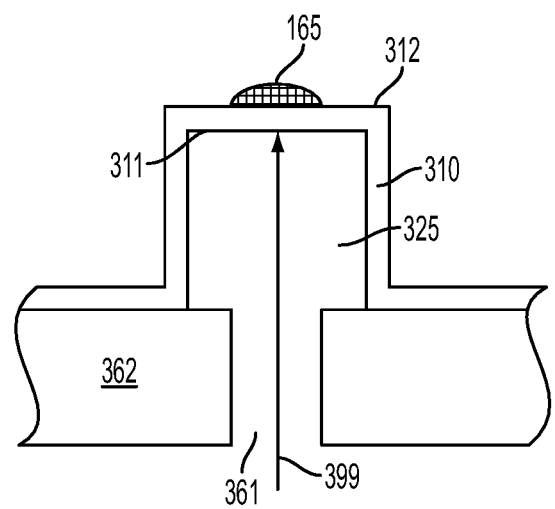

As illustrated in FIGS. 3A and 3B, heating of the ejector layer 310 may occur due to laser light 399 that is transmitted through a substrate 360 that is transparent to the laser light and through hollow area 325 (which may be an air gap). In these configurations, the laser light 399 is first incident on the first surface 311 of the ejector layer 310.

Figure 3C:
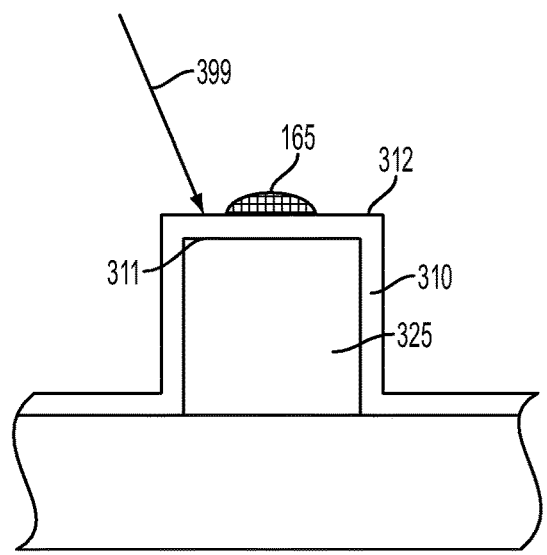

In some configurations, as shown in FIG. 3B, the substrate 362 need not be substantially transparent to the laser light 399. The laser light is directed through one or more vias 361 formed through the substrate 362. The laser light 399 travels through the vias 361, through the hollow area 325 and first encounters the ejector layer 310 at the first surface 311 of the ejector layer 310. In some implementations, as shown in FIG. 3C, the laser may be positioned so that the laser light 399 first encounters the ejector layer 310 at the second surface 312 of the ejector layer 310.

As previously discussed, the ejector layer may be a single layer unimorph or a multimorph comprising multiple layers. When heated by the laser light, thermal expansion causes the unimorph or multimorph ejector layer to thermally expand, the thermal expansion resulting in an out of plane displacement of the ejector layer, e.g., along the +z axis indicated in FIG. 1A. The displacement caused by thermal expansion may be a relatively continuous displacement or may be a sudden displacement due to buckling of the ejector layer. For example, as discussed in more detail below, Euler buckling and snap buckling are two buckling phenomena that may lead to buckling of the ejector layer due to thermal expansion. Buckling displaces the ejector layer over a shorter period of time leading to higher acceleration of the ejector layer when compared to continuous displacement of the ejector layer.

Figure 3D:
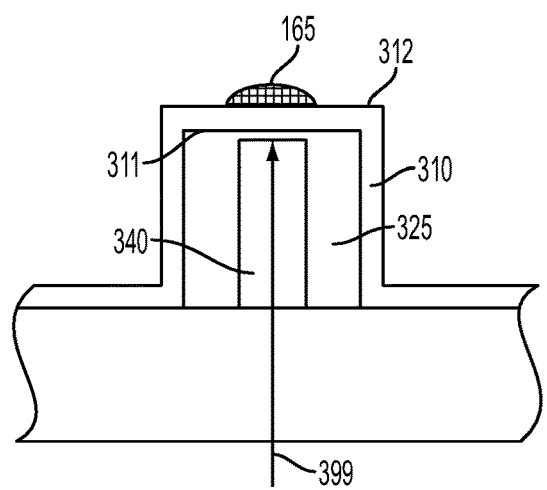
FIG. 3D illustrates an ejector device that includes a stop feature in accordance with some embodiments.

For highly absorbing layers the incident laser radiation is more strongly absorbed near the surface of incidence. The exponentially decreasing level of radiation leads to greater heating and concomitant thermal expansion nearest the surface of incidence of the excitation light. Thus, even in a unimorph ejector, a bias exists which breaks the out of plane symmetry and biases the structure for buckling towards the surface of incidence. Furthermore, a unimorph ejector layer having a single layer can exhibit more directional variability in the buckling of the ejector layer when compared to the directional determinism of buckling bimorph or multimorph ejector layers. In some implementations the ejector layer may have certain features or properties that cause the ejector layer to deflect in a particular direction. For example, the ejector layer may include features on one or both of the first and second surfaces, e.g., corrugation features or puckers, that bias the deflection in a particular direction. Alternatively or additionally, the ejector device may optionally include one or more stop features that limit the deflection of the ejector layer in some directions, e.g., the −z direction, as shown in FIG. 3D. FIG. 3D illustrates a stop feature 340 disposed within the hollow area 325 to limit the displacement of the ejector layer 310 in the −z direction. The one or more stop features within the hollow area may comprise a number of cylinders, a narrow mesa and/or a tapered mesa supported by the substrate 350. As shown in FIG. 3D, the stop feature may be configured so that the activation light can be focused within the stop feature.

Figure 4A:
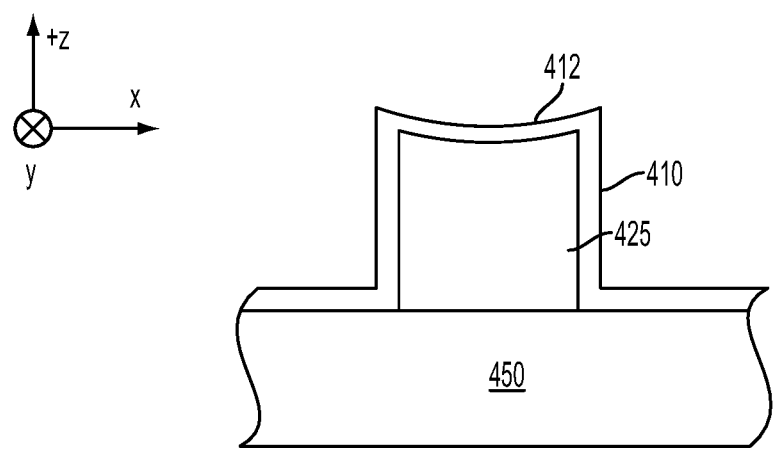
FIGS. 4A-4B illustrate convex and concave ejector surfaces, respectively, in accordance with various embodiments.
Figure 4B:
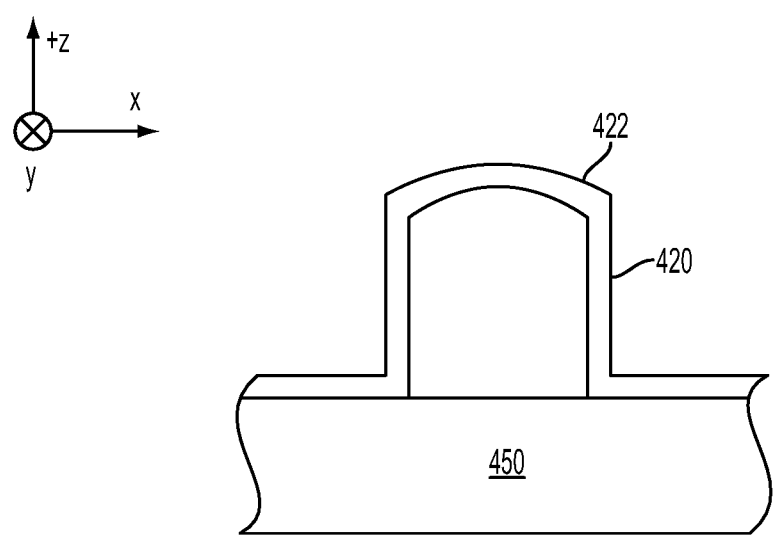

As shown in FIGS. 4A and 4B, respectively, prior to heating and/or thermal expansion, a portion of the second surface of the ejector layer 410, 420 may be a convex surface 412—curved toward the substrate 450 or may be a concave surface 422—curved away from the substrate 450. In configurations as illustrated in FIG. 4B that include a concave ejector layer surface 422, heating and thermal expansion may cause additional deflection of the ejector layer 422 in the direction of the concavity (positive z direction as shown in FIG. 4B).

In configurations as illustrated in FIG. 4A that include a convex ejector layer surface 412, heating and thermal expansion may cause additional deflection of the ejector layer 412 in the direction of the convexity (negative z direction as shown in FIG. 4A), particularly if the ejector layer 410 is a unimorph.

Figure 4C:
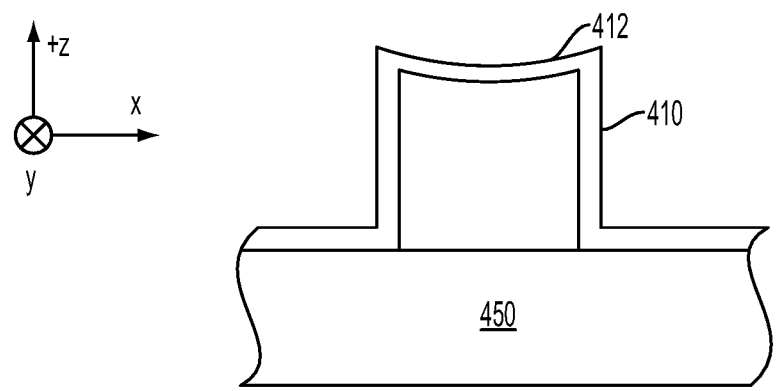
FIGS. 4C-4E illustrate thermal expansion of an initially convex ejector layer in accordance with some embodiments.
Figure 4D:
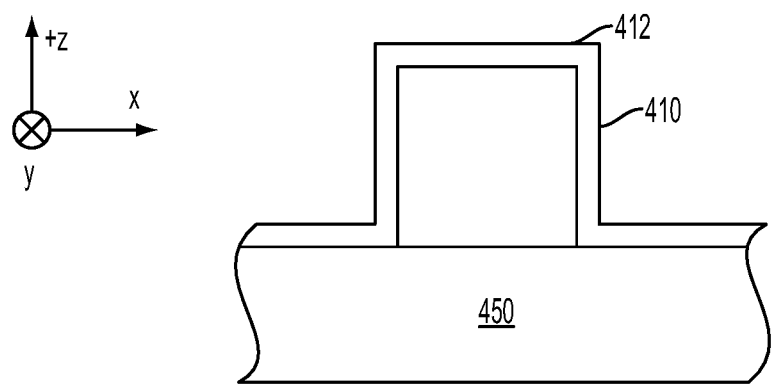
Figure 4E:
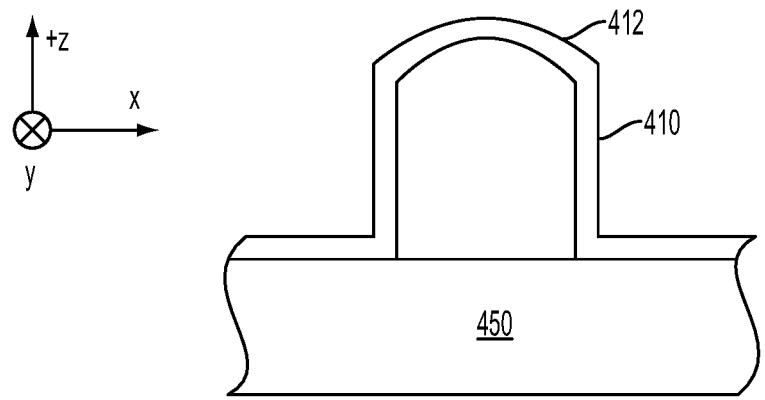

In configurations that include a convex ejector layer surface 412, as illustrated in FIGS. 4C-4E, the deflection of the ejector layer 410 due to thermal expansion may cause the ejector portion 412 of the ejector layer 410 to deflect from a convex −z position as shown in FIG. 4C, through a zero z position as shown in FIG. 4D, to a concave +z position as shown in FIG. 4E. The illustrated deflection propels an ink droplet disposed on the surface 412 toward the print surface with a "slingshot" type snapping deflection motion.

Zero stress, uniform stress or a stress gradient may be incorporated into one or more of the ejector layers by appropriately adjusting deposition parameters used to deposit the layer such that no stress or unresolved lateral stresses are frozen into the layer. For example, where the ejector layer is deposited by sputtering, sputtering parameters such as sputtering rate and/or voltage, can be adjusted to form layers with zero stress, with uniform compressive or tensile stress or with a stress gradient.

In some implementations, the unimorph or multimorph ejector layer may be formed so that the ejector layer has no internal stress. Layers with zero internal stress may be substantially flat, or may be concave or convex.

In some implementations, the unimorph or multimorph ejector layer may be formed so that one or more of the ejector layers have a uniform internal stress through the thickness of the layer along the z axis. The internal stress gradient causes the ejector layer to have a bias toward deflection out of the xy plane in either the +z or −z direction. When layers deposited with uniform tensile stress are released by etching of the sacrificial material, the ejector layer resembles a stiff drum head. Uniform compression may cause the ejector layer to deflect, e.g., non-deterministically, or to resolve to a higher mode, e.g., forming waves or corregations in the layer.

In some implementations, the unimorph or multimorph ejector layer may be formed to have a stress gradient along the z axis. For ejector layer formed with a stress gradient, the ejector layer may be designed for snap buckling. Snap buckling may be able to achieve higher acceleration than continuous deflection. Formation of a stress gradient in the ejector layer can be implemented by forming a first portion of the ejector layer proximate to the sacrificial material so that it is under compressive stress and forming a second portion of the ejector layer on the opposing side so that it is under no stress or tensile stress. After the sacrificial material is removed, the first portion of the ejector layer proximate to the (now absent) sacrificial material is biased to expand and the opposing second portion of the ejector layer is biased to contract or not expand. These internal stresses cause the ejector layer to deflect slightly towards the −z direction to form a convexly dimpled membrane as shown in FIG. 4C. When heated, by design the portion of the ejector layer nearest the substrate expands more quickly than the upper portion of the ejector layer so that when thermal expansion occurs, the ejector layer deflects through the midpoint (FIG. 4D) and continues to deflect in the +z direction (FIG. 4E) where the ejector layer is again at rest at a local stress minimum.

Figure 5:
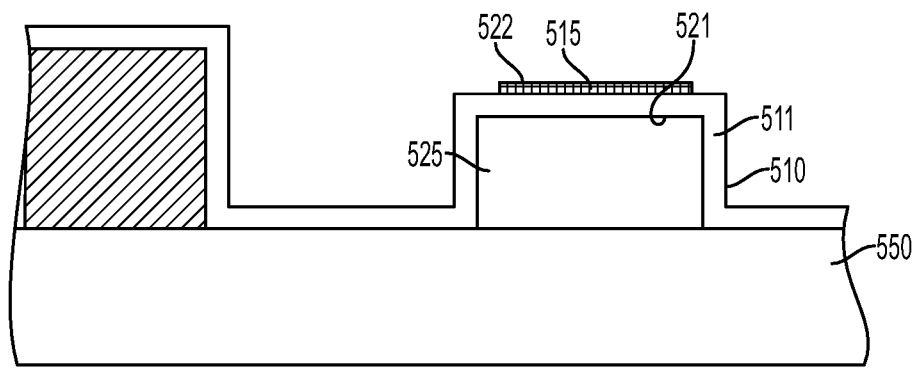
FIGS. 5 and 6 provide cross sectional views of portions ejection devices according to various aspects.
Figure 6:
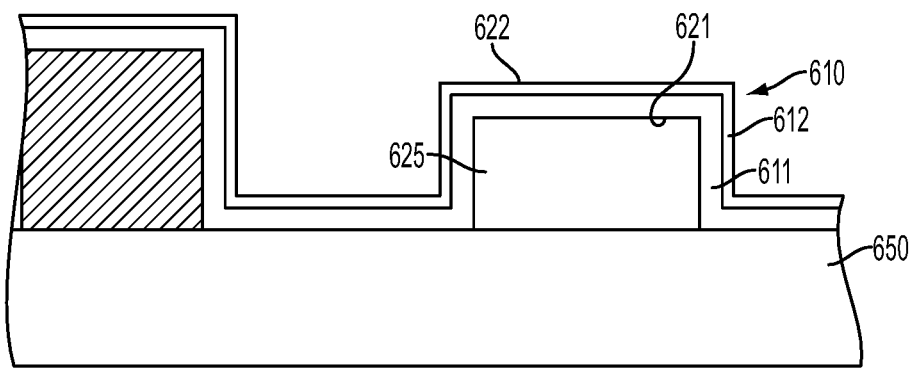

FIGS. 5-6 provide cross sectional views of various aspects of ejector devices. FIG. 5 shows a portion of an ejector device that includes a unimorph ejector layer 510 in accordance with some embodiments. As previously discussed, some implementations include a transparent substrate wherein the activation radiation is transmitted through the transparent substrate 550, through the hollow area 525 and is initially incident on the first surface 521 of the unimorph ejector layer 510. The thermal expansion of the layer 510 causes deflection of the layer 510 and ejection of a droplet of the ejectable material (not shown in FIG. 5) from the second surface 522 of the ejector layer 510. The deflection due to thermal expansion may be relatively continuous, or may be a sudden deflection due to buckling.

The ejector layer 510 may include various monolayers that contribute to various characteristics of the ejector layer 510 such as optical absorption, antireflective properties, surface interfacial energy, and/or other characteristics. In implementations that include such monolayers, the ejector layer may still be referred to as a unimorph because the additional monolayers may be negligibly thick, are not under tensile or compressive stress in the plane of the ejector layer, and/or do not significantly contribute to the mechanical response of the unimorph ejector layer to heating.

In some implementations, the ejector layer 510 optionally includes a binding layer 515 and/or surface treatment of the ejector layer. When a binding layer and/or surface treatment is included, the binding layer and/or surface treatment can be disposed in the region of the ejector, e.g., where the ejector layer 510 spans the hollow area 525 and may extend over the walls of the ejector mesa and/or over the channel surface. The binding layer and/or surface treatment may be designed to provide a specified surface energy at the second surface 522 of the ejector layer 510. The specified surface energy is selected to initially retain the ink droplet on the second surface 522 and then to allow for the ejection of the ink droplet from the second surface 522 when the ejector layer deflects. The surface energy of the second surface of the ejector layer may provide for a contact angle with the ink of greater than 10 degrees, greater than 50 degrees, greater than 80 degrees, for example, about 90 degrees or in the range of about 50 to about 100 degrees.

Some types of ink, e.g., bio-inks are heat sensitive. At least one of the ejector layers may comprise a thermally resistive layer configured to impede heat transfer to the ejectable material in the channel and/or on the ejector surface. The thermally resistive layer may have a thermal resistance (equal to thermal conductance×layer thickness) that provides heat transfer from the absorber layer of the ejector layer to the ejectable material that is less than a specified value.

FIG. 6 illustrates in cross section a portion of an ejector device that includes a multimorph (bimorph) ejector layer 610 comprising multiple layers 611, 612 that each contribute to the mechanical response to heating of the ejector layer 610. Each layer 611, 612 of the bimorph ejector layer 610 can have a different thermal coefficient of expansion (CTE). In general, a thermal bimorph may include two or more than two layers bonded together, one of the layers having a higher CTE than the other layer. When bimorph layers are deposited, the layer materials may be at their equilibrium lengths and, if so, the bimorph will be substantially flat as released from the sacrificial layer. When the temperature of the bimorph increases, the layer having the higher CTE expands more than the layer having the lower CTE. When heated, due to the layers being bonded together, the high CTE material is stretched below its equilibrium length and undergoes lateral compressive stress and the low CTE material is stretched above its equilibrium length and undergoes lateral tensile stress. The compressive stress of the higher CTE material and the tensile stress of the lower CTE material cause the bimorph to curl towards the lower CTE material to minimize the internal energy stored by the stress.

The use of thermal bimorph layers can enable Euler buckling above a stress threshold. Euler buckling in a bimorph occurs when the lateral compressive stress in the bimorph layer having a higher coefficient of thermal expansion becomes large enough for the buckled mode to lie at lower energy than the flat stressed layer. Deflection of the bimorph ejector layer during buckling can provide much faster acceleration than the average rate of change of the stress, thereby effectively increasing the momentum transfer to the droplet of ejectable material.

In some embodiments, the bimorph ejector layer 610 can include a first layer 611 that is substantially transparent to the activation radiation and a second layer 612 disposed over the first layer 611 that is highly absorbing to the activation radiation. In other embodiments, the bimorph ejector layer 610 can include a first layer 611 that is highly absorbing to the activation radiation. In the latter case the thermal equilibration time constant between the sublayers needs to be short in comparison to the buckling time. The first layer 611 has a first coefficient of thermal expansion, $CTE_1$, and a second sublayer 412 has a second coefficient of thermal expansion, $CTE_2$, wherein $CTE_2 > CTE_1$.

The ejector layer 610 thermally expands without phase transition and may buckle after a threshold stress is reached in the second sublayer 612 in response to heating by activation radiation which is transmitted through the substrate 650, through the hollow area 625 and absorbed in either the first sublayer 611 and/or the second sublayer 612 of the ejector layer 610. Euler buckling of the bimorph layer 610 causes ejection of a droplet of the ejectable material (not shown in FIG. 6) from the second surface 622 of the ejector layer 610. Although not shown in FIG. 6, in some implementations, the bimorph may include additional monolayers, such as a binding layer and/or surface treatment of the ejector layer as discussed in connection with FIG. 5.

Figure 7A:
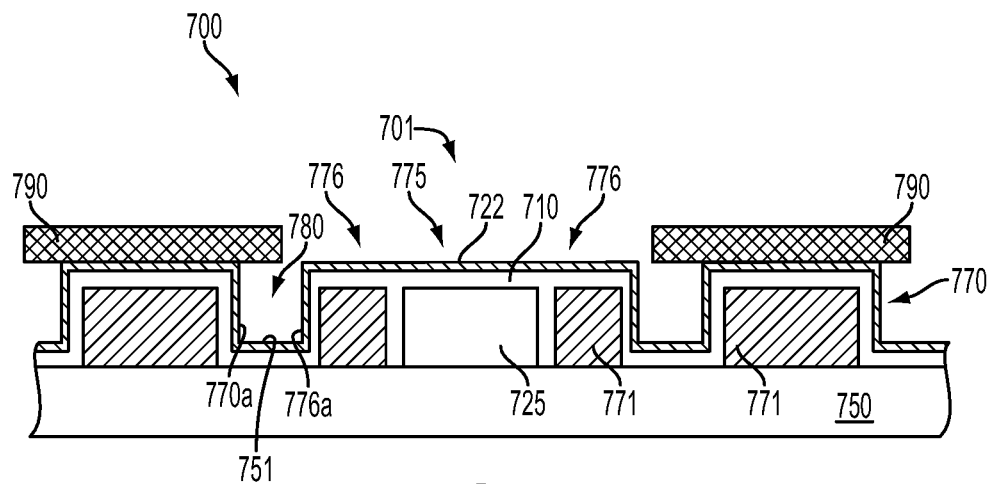
FIG. 7A is a cross sectional view of an ejector device the includes support structures in accordance with some embodiments.
Figure 7B:
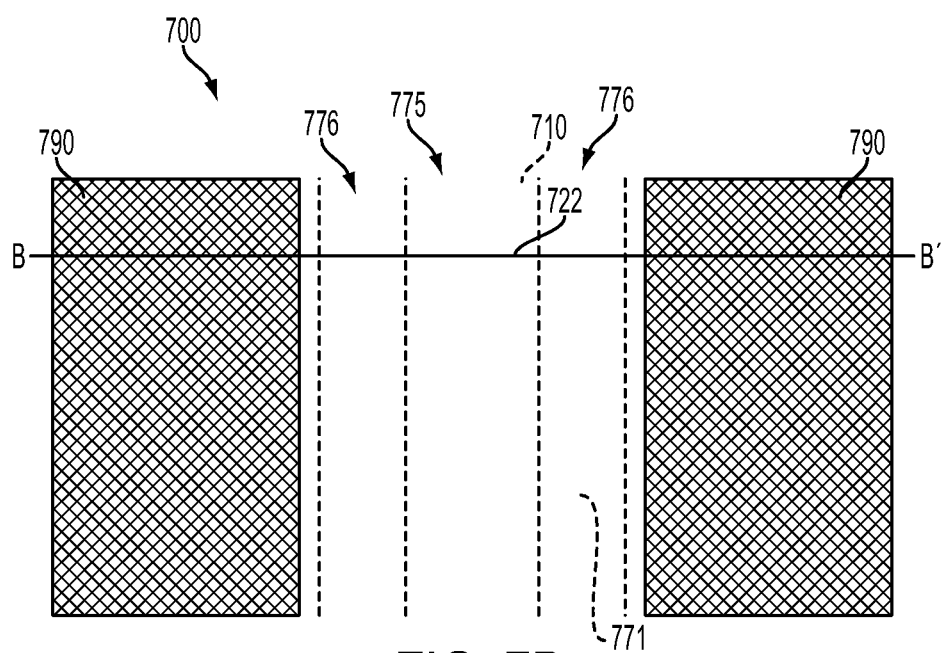
FIG. 7B is a plan view of the ejector device of FIG. 7A.

In some implementations, an ejector mesa 775 may include one or more support structures comprising support material 771, e.g., submesas 776 as shown in FIGS. 7A and 7B. The support submesas 776 are adjacent and bonded to the ejector mesa 775. The cross sectional view of FIG. 7A is taken through plane B-B' of FIG. 7B. The ejectors 701 include an ejector layer 710 that spans hollow area(s) 725 of ejector mesa 775 and also covers at least a portion of the tops of the support structures 776. The ejector layer 710 may optionally extend over the sides of the support structures 776, over the surface of the substrate 751, and/or over the tops of mesas 570. At least one of the layers of the ejector layer 710 is configured to thermally expand without phase transition in response to heating by activation radiation. Thermal expansion of the layer of the ejector layer 710 causes deflection of the ejector layer 710 and ejection of the droplet from the ejector layer 710.

Mesas 770 may optionally be disposed on one or both sides of the ejector mesa 775. Channels 780 are formed by the mesa walls 776a, 770a and the region 751 adjacent to and/or between the mesa walls 776a, 770a. The mesas 770 comprise mesa support material 771 without hollow area(s). As shown in FIG. 7A, one or more sublayers of ejector layer 710 can be a continuous layer that extends over the mesa support material 771 of the support structure(s) 776, spans the hollow area 725, extends over region 751 of channel 780, and/or extends over the mesa support material 771 of mesa(s) 770.

The channels 780 can be arranged to carry the ejectable material to the ejectors 701. To fill the ejectors, the ejectable material can be caused to flow through the channels 780 and over the ejector surface 722 of the ejector layer 710 and subsequently to recede, leaving droplets of the ejectable material preferentially adhering to the ejector surface 722. An aperture structure 790 that at least partially covers the channels 780 may be used to facilitate retention of the ejectable material in the channels 780 during the filling process.

Figure 8A:
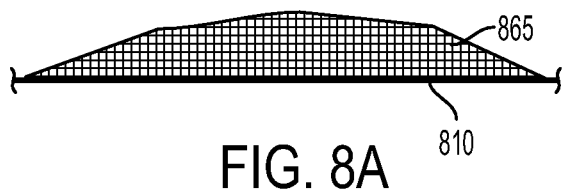
FIGS. 8A-8D illustrate ejection of a droplet of ejectable material from the free surface of an ejector layer.

FIGS. 8A through 8D illustrate ejection of a droplet 865 of ejectable material from the free surface of an ejector layer 810. FIG. 8A shows the droplet 865 and ejector layer 810 in its steady state condition at time $t_0$, prior to heating by the activation radiation.

Figure 8B:
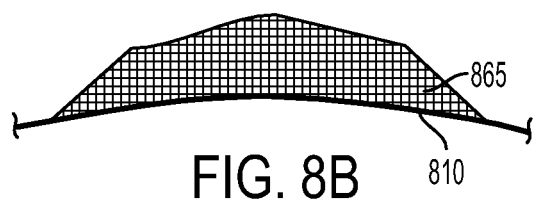

FIG. 8B illustrates the ejector layer 810 and droplet 865 at time $t_1$, the point of maximum excursion of the ejector layer 810 from its steady state condition by relatively constant deflection and/or buckling due to thermal expansion. The excursion of the layer 810 is maximum and the velocity of the membrane 810, $V_{membrane}$, due to thermal expansion is zero in FIG. 8B.

Figure 8C:
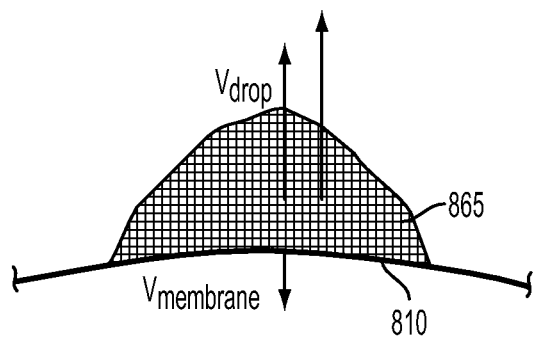

FIG. 8C shows the membrane 810 as it rebounds and cools and moves toward its steady state position with velocity $V_{membrane}$. The droplet 865 is moving away from the membrane 610 with a velocity $V_{drop}$. The velocity of the droplet $V_{drop}$ relative to the velocity of the membrane $V_{membrane}$ must exceed a threshold velocity, $V_{threshold}$, to detach from the surface of the membrane 610, where $$V_{threshold} = \left(\frac{2\gamma A}{m}\right)^{\frac{1}{2}},$$

where γ is the interfacial energy of the free surface of the ejector membrane 810, A is the area of the droplet 865, and m is the mass of the droplet 865. For example, where the ejector surface layer 810 is polycarbonate having a surface energy of about 0.03 J/m², for a droplet having a thickness of about 4 μm, an area of about 50 μm, and a mass of about $10^{-11}$ kg, $V_{threshold} \approx 4$ m/s.

Figure 8D:
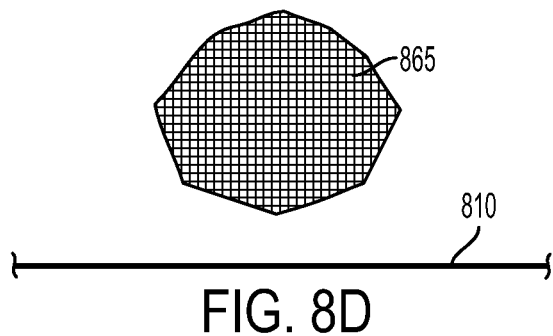

FIG. 8D shows the droplet 865 after detachment from the ejector layer 810. The ejector layer 810 has returned to its steady state position.

Figure 9A:
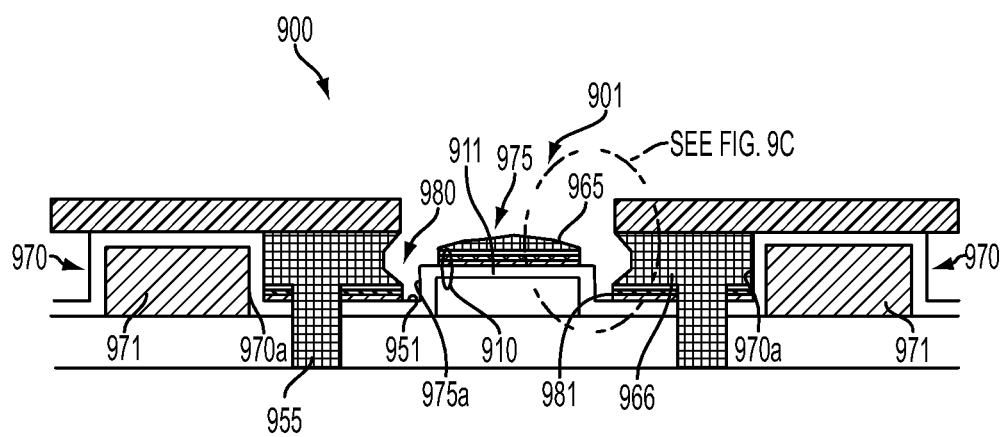
FIGS. 9A-9C illustrate an ejector device in accordance with some embodiments.
Figure 9B:
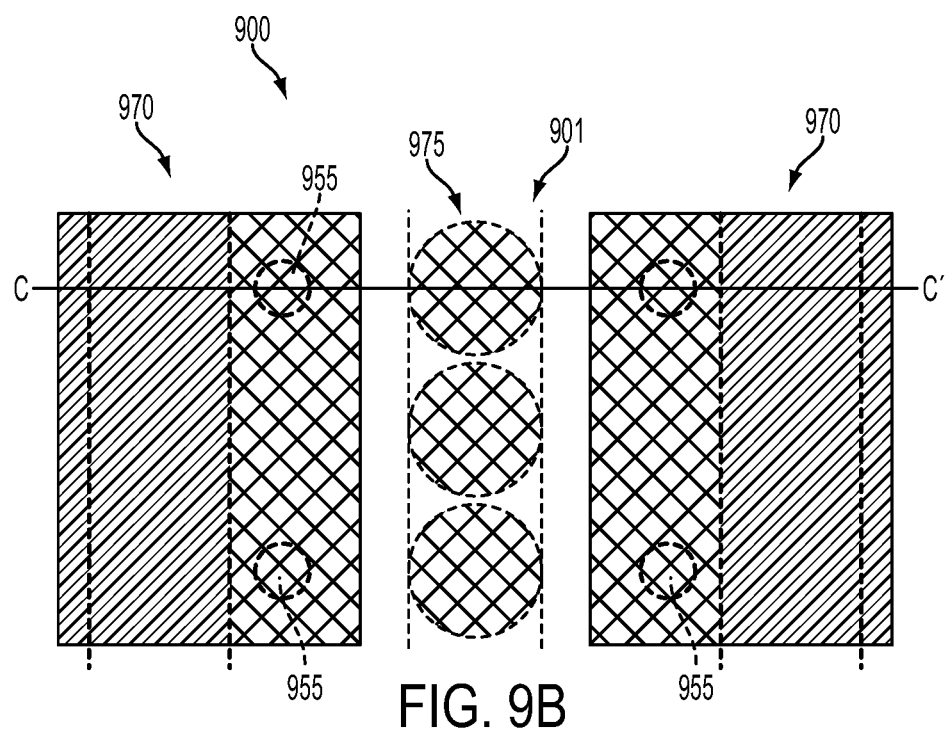
Figure 9C:
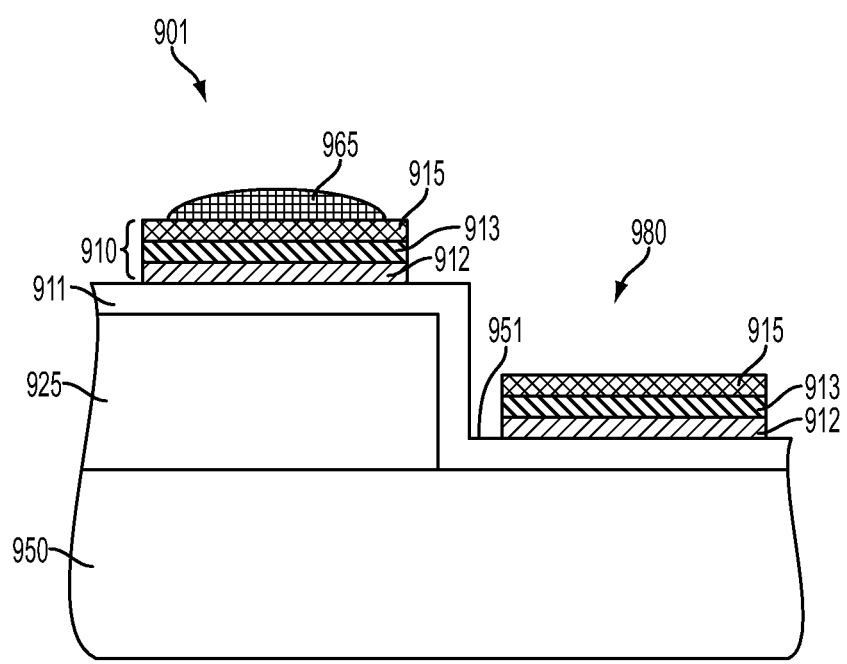

FIGS. 9A-9C illustrate an ejector device 900 in accordance with some embodiments. FIG. 9B is a plan view of the ejector device 900 and FIG. 9A is a cross sectional view taken through plane C-C'. FIG. 9C shows a cross sectional view of layers of ejector layer 910. In some implementations, one or more of the ejector layers may also partially or fully cover the mesa walls 970a. The ejector 901 is formed with a hollow area 925 between the ejector layer 910 and the substrate 950. The ejector layer 910 includes layer 911 that is substantially transparent to the activation radiation. Layer 911 spans the hollow area(s) 925 of ejector mesa 975, the channel 980, and mesas 970. In the illustrated embodiment, layers 912, 913, 915 of the ejector layer 910 at least partially cover the hollow area 925. In other implementations, one or more of sublayers 912, 913, 915 may optionally conformally cover the channels 980 and/or mesas 970.

The ejector layer 910 is disposed on a substrate 950 wherein vias 955 through the substrate fluidically connect the channels 980 with a manifold, reservoir or other structure (not shown in FIG. 9A) configured to contain the ejectable material 965 such as a bio-ink. At least one of the sublayers of the ejector layer 910 is configured to thermally expand without phase transition in response to heating by activation radiation, e.g., laser light, which can be transmitted through a substrate 950 substantially transparent to the laser light. The laser light is transmitted through the hollow area 925, and through the radiation transparent layer 911. In some embodiments, the layers of the ejector layer 910 form a thermal bimorph configured to undergo Euler buckling.

As best illustrated by FIG. 9C, layers 911 and 912 form a thermal bimorph wherein layer 912 has a higher CTE than layer 911. In some embodiments, layer 913 is optionally present as a low modulus, high thermal expansion coefficient thermal insulator, such as silicone or polycarbonate. In some embodiments, layer 915 is an optional additional surface energy presenting layer such that the droplet wetting angle is ~90 degrees. In some embodiments, layer 911 may be or comprise silica and layer 912 may be or comprise amorphous germanium, amorphous silicon, or tungsten, for example. Some typical values for CTEs ($\times 10^{-6}$ per degree centigrade) are 0.6 for silica, 6 for silicon, 8 for amorphous germanium, and 13 for tungsten. One or more of the ejector layers 912, 913, 915 may extend to and/or may be patterned in the channel 980. In some embodiments, a heat conducting layer such as copper may be patterned in the channel and/or may extend up the walls of the mesas to help spread the heat after each laser pulse. The substrate 950 may comprise a material that provides structural support for the ejector device and may be substantially transparent to the activation radiation. For example glass is a suitable material for the substrate 950. The mesa material may comprise silica, silicon oxynitride, silicone, etc.

Parameters for the layers of the ejector device can be varied to provide for ejection at a specified, e.g., minimum, laser energy input. Radiation power density of the activation light may be in a range of about 10 to 100 mW per ejector and pulse length range of about 0.1 to 10 microseconds. Layer thicknesses for each layer may be in a range of about 1 to 100 microns. Ejector diameters of 10-100 microns with similar pitch are suitable for many embodiments of the ejector device.

Returning now to FIGS. 9A and 9B, in addition to at least one ejector mesa 975 spanning hollow area(s) 925, the ejector device 900 includes mesas 970. The mesas 970 may optionally be disposed on one or both sides of ejector mesa 975. In the illustrated embodiment, the ejector device 900 includes at least one channel 980 formed by the mesa walls 970a, 975a and the region 951 between the mesa walls 970a, 975a.

As shown in FIG. 9A, one or more layers of ejector layer 910, may conformally coat the region 951 of channel 980, and/or the mesa support material 971 of the sides and/or top of mesa 970. One or more layers, e.g., a thermal absorber layer, can be optionally disposed over layer 911 in the channel 980 and/or over the channel walls 970a, 975a. In some embodiments, one or more of the layers 912, 913, 915 of the ejector layer 910 may be patterned on the ejector 901 region and region 951 as shown in FIG. 9C.

The channels 980 are arranged to carry the ejectable material 966 to the ejectors 901. To fill the ejectors, the ejectable material 966 can be caused to flow through vias 955 to the channels 980 and over the ejector surface of the ejector layer 910 and subsequently to recede, leaving droplets 965 of the ejectable material 966 preferentially adhering to the ejector surface of the ejector layer 910. An aperture structure 990 that at least partially covers the channels 980 may be used to facilitate retention of the ejectable material 966 in the channels 980 during the filling process.

Figure 10A:
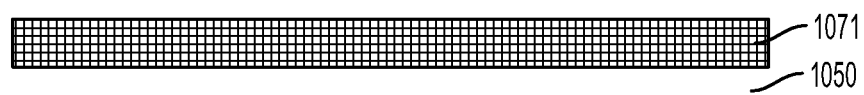
FIGS. 10A-10I illustrate a process of fabricating an ejector device in accordance with some embodiments.
Figure 10B:
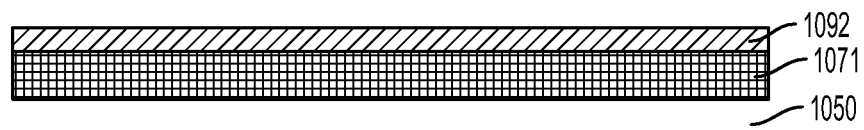
Figure 10C:
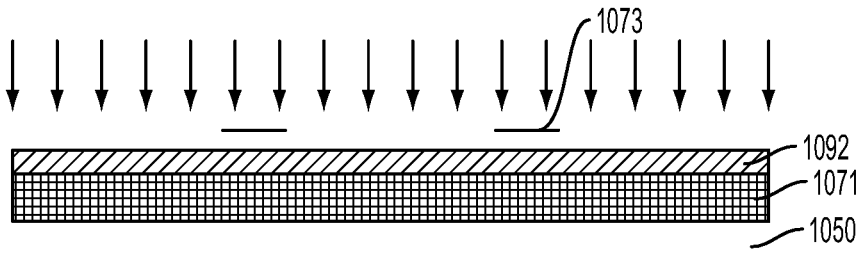
Figure 10D:
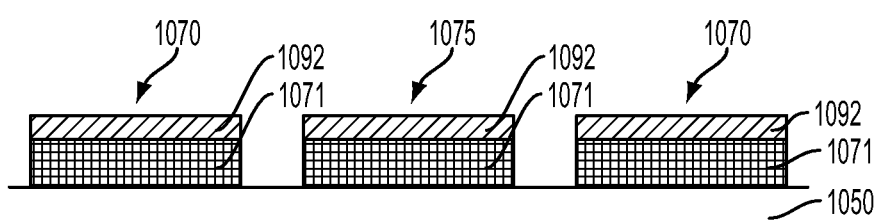
Figure 10E:
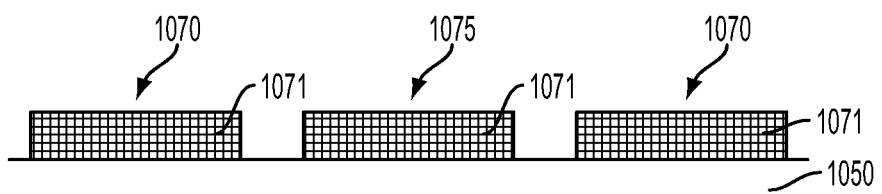

FIGS. 10A through 10I illustrate a process for making ejector devices discussed herein in accordance with some embodiments. FIG. 10A shows a substrate, e.g., silica 1050 having an unpatterned layer of the mesa support material 1071 deposited thereon. The mesa support material 1071, e.g., poly silicon, can be patterned using a photolithographic process illustrated in FIGS. 10B through 10E. A photoresist layer 1092 is deposited (FIG. 10B) on the unpatterned mesa support material 1071 and is developed by radiation through a patterned mask 1093 (FIG. 10C). After the photoresist is developed, the subassembly is exposed to an etchant. If a negative resist is used, the irradiated areas of the photoresist 1092 are resistant to the etchant and the non-irradiated areas are etched to form mesas 1070, 1075 topped with photoresist 1092. The photoresist 1092 is stripped away leaving the mesas 1070, 1075 of support material 1071 on the substrate 1050 (FIG. 10D). Alternatively to the processes of FIGS. 10A through 10D, the mesas 1070, 1075 can be patterned by deposition through a contact mask or applied by printing such as flexography or soft lithography.

Figure 10F:
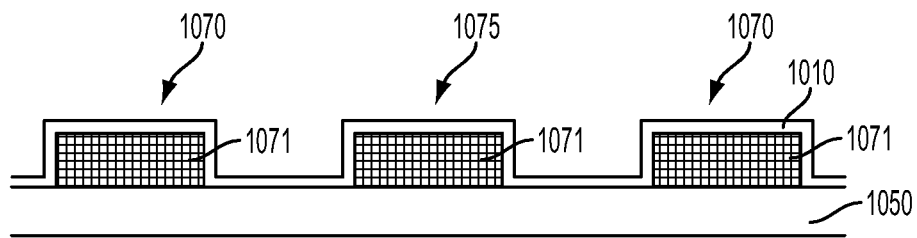
Figure 10G:
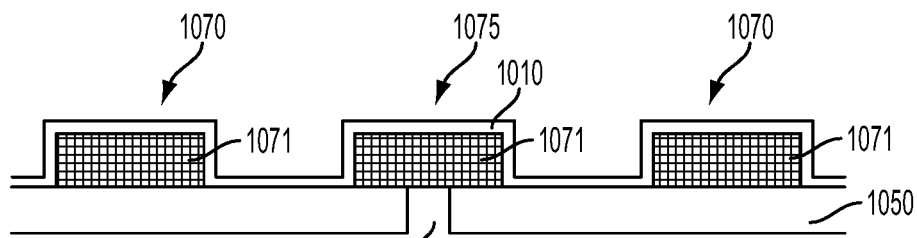
Figure 10H:
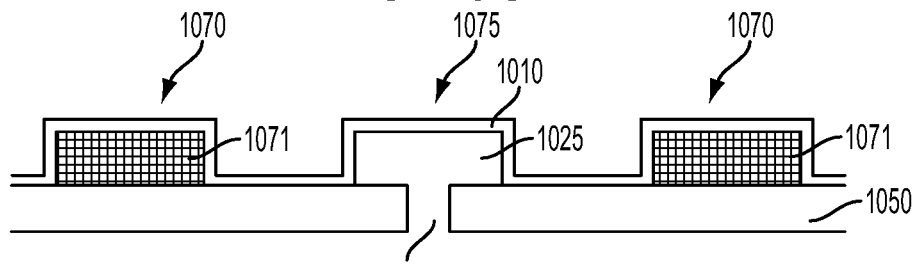
Figure 10I:
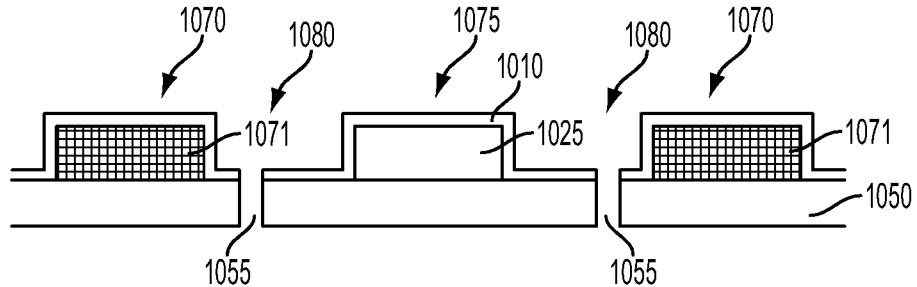

The ejector layer 1010, including one or more sublayers, is conformally coated over the mesas 1070, 1075 (FIG. 10F). According to some implementations, as shown in FIG. 10G, one or more access vias 1094 are formed through the substrate 1050 to allow etchant access to sacrificial mesa 1075 through the substrate. For example, in some implementations, one via is used for each ejector formed. Alternatively, the sacrificial material 1071 of mesa 1075 may be etched from ends of the mesa 1075 opened by a photolithographic process or mechanical removal. The subassembly is exposed to an etchant which etches the mesa support material 1071 of mesa 1075 forming one or more hollow area(s) 1025 (FIG. 10H). The etchant access via 1094 through the substrate 1050 may be closed. Alternatively, if the substrate material is opaque to the activation radiation, the vias may be left open and used as an optical pathway allowing the activation radiation to heat the ejector layer. One or more vias 1055 are formed through the substrate 1050 to fluidically couple the channels with a reservoir or other structure configured to contain the ejectable material (FIG. 10I).

Figure 11A:
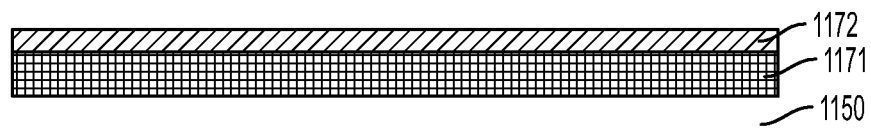
FIGS. 11A-11D illustrate a process of fabricating an ejector device having an ejector mesa with surface features in accordance with some embodiments.
Figure 11B:
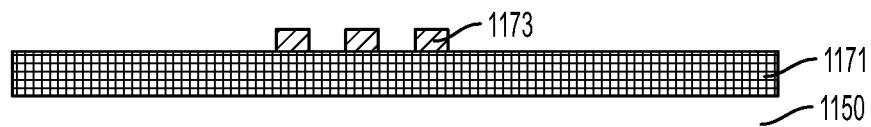
Figure 11C:
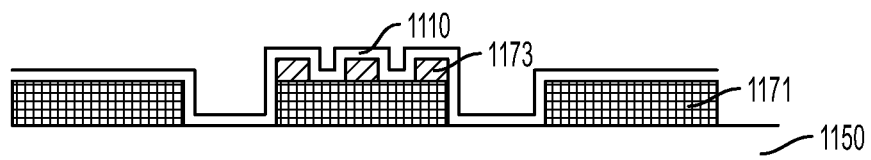
Figure 11D:
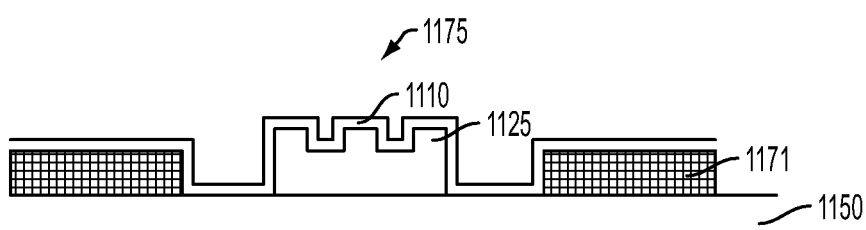

In some implementations, two layers of sacrificial material are used to form the ejector layer. Each of the layers may have different etching properties and/or may be etched by different etchants. The use of two sacrificial layers allows the surface of the ejector layer to be formed in more complex shapes. FIG. 11A shows first and second layers 1171, 1172 of sacrificial material deposited on a substrate 1150. The first layer 1171 and the second layer 1172 of sacrificial material are etched into patterned features, for example, by standard photolithographic processes (FIG. 11B). In some embodiments the patterned features 1173 comprise one or more hemispherical caps. The ejector layer 1110 is conformally coated over the patterned features and the first layer 1173, 1171 (FIG. 11C). The first then second layers are etched to form the ejector mesa 1175 (FIG. 11D) that includes an ejector layer 1110 spanning a hollow area 1125 and having the surface features provided by the pattern of the second layer of sacrificial material.

Figure 12A:
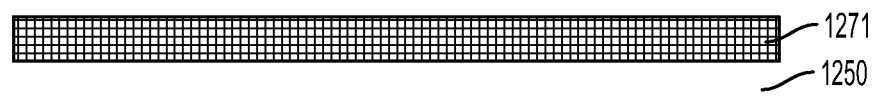
FIGS. 12A-12I illustrate a process of fabricating an ejector device having an ejector mesa with built in convexity in accordance with some embodiments.
Figure 12B:
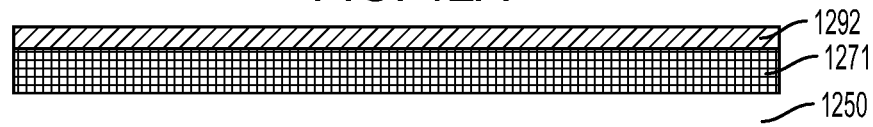
Figure 12C:
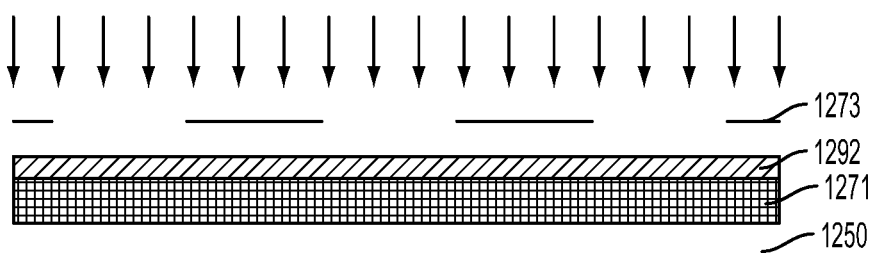
Figure 12D:
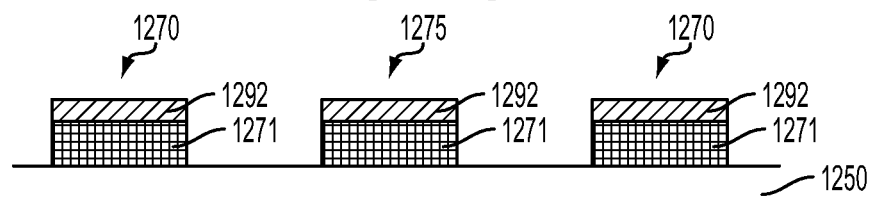

FIGS. 12A-12I illustrate a method for making an ejector device having a convex ejector layer that can be formed with zero stress in accordance with some embodiments. FIG. 12A shows a substrate 1250 having an unpatterned layer of the mesa support material 1271 deposited thereon. The mesa support material 1271 can be patterned using a photolithographic process illustrated in FIGS. 12B through 12D. A photoresist layer 1292 is deposited (FIG. 12B) on the unpatterned mesa support material 1271 and is developed by radiation through a patterned mask 1023 (FIG. 12C). After the photoresist is developed, the subassembly is exposed to an etchant. The irradiated areas of the photoresist 1292 are resistant to the etchant and the non-irradiated areas are etched to form mesas 1270 and sacrificial mesa 1275 topped with photoresist 1292. The photoresist 1292 is stripped away leaving the mesas 1270, 1275 of support material 1271 on the substrate 1250 (FIG. 12D). Alternatively to the processes of FIGS. 12A through 12D, the mesas 1270, 1275 can be patterned by deposition through a contact mask.

Figure 12E:
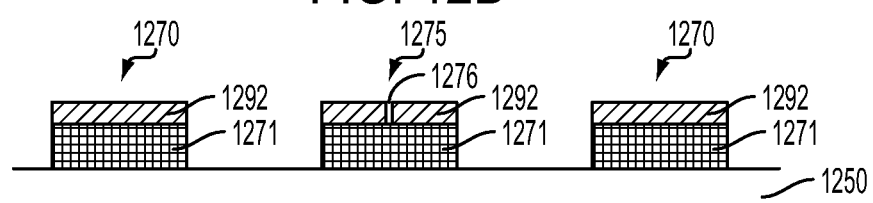
Figure 12F:
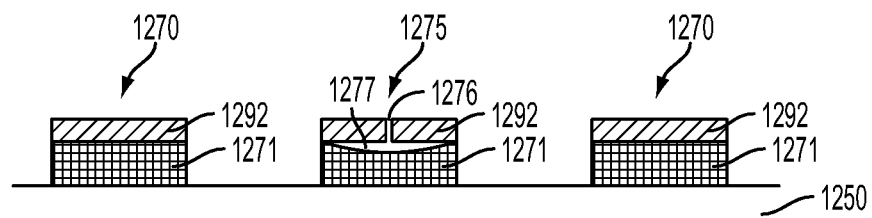
Figure 12G:
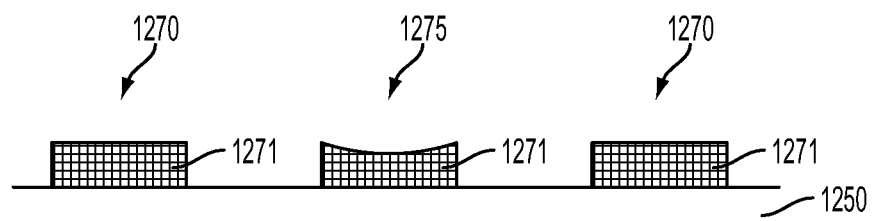
Figure 12H:
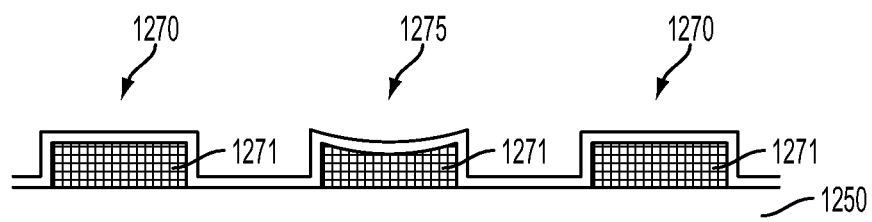
Figure 12I:
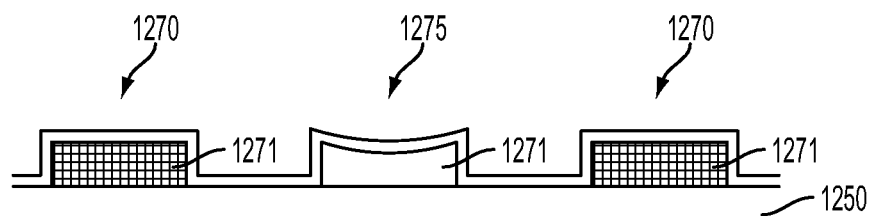

A pin hole is opened in the photoresist that covers the top of the sacrificial mesa 1275 (FIG. 12E). The top of the sacrificial mesa 1275 is exposed to an etchant through the pinhole for a sufficient amount time to produce a convex surface at the top of the sacrificial mesa 1275 (FIG. 12F). The photoresist is then stripped away (FIG. 12G) and the subassembly is conformally coated with the ejector layer (FIG. 12H). The sacrificial material 1271 of mesa 1275 is etched, e.g., from open ends of the mesa 1275 or through one or more vias in the substrate. The resulting ejector mesa 1275 includes a convexly shaped ejector layer 1210 (FIG. 12I).

Figure 13:
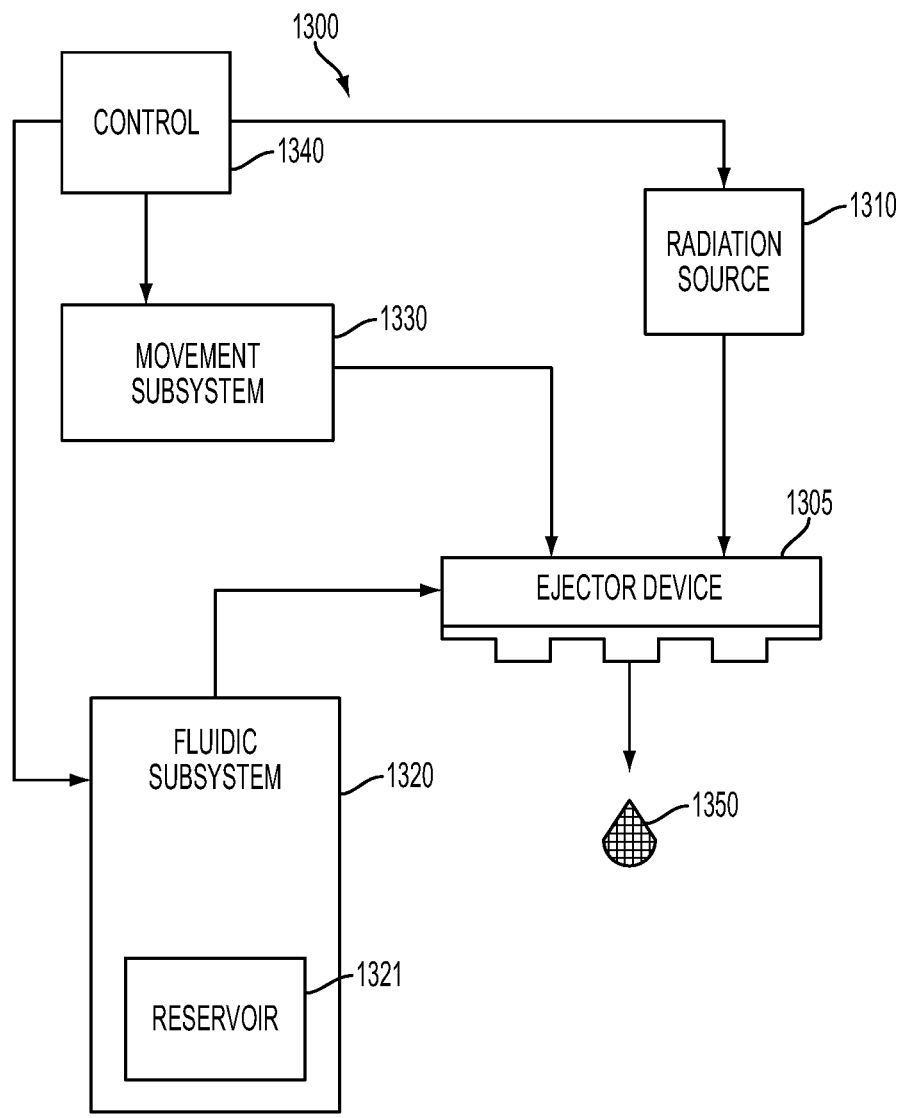
FIG. 13 is an ejector system in accordance with some embodiments.

FIG. 13 is a block diagram of an ejector system 1300. The system 1300 includes an ejector device 1305, e.g., as previously discussed, that includes at least one ejector configured to eject droplets of an ejectable material when the ejector is heated by a radiation from an activation radiation source 1310 such as a source of laser light. The ejector device 1305 includes an ejector layer that is configured to thermally expand without phase transition in response to heating by the activation radiation. The thermal expansion of the ejector layer causes ejection of droplets 1350 from the ejector layer. The ejectable material is contained in a reservoir 1321 or other structure that is fluidically coupled to channels of the ejector device 1305. The reservoir 1321 is part of a fluidic subsystem that may additionally include one or more manifold(s), pump(s) and/or other fluidic components configured to move the ejectable material to the ejectors. For example, the fluidic subsystem may include one or more pump(s) configured to apply positive and/or negative pressure to the ejector material to charge the ejectors with droplets of ejectable material. The pump(s) may apply a positive pressure to pressurize the ejectable material, causing the ejectable material to flow in the channels of the ejector device and over the free surface of the ejectors. The pump(s) may apply negative pressure to depressurize the ejectable material, causing the ejectable material to recede from the channels leaving droplets of ejectable material preferentially adhering to the free surface of the ejectors.

Movement subsystem 1340 is a structure that allows the ejector device to move linearly in one, two, or three dimensions along x, y, and/or z axes and/or to rotate around x, y, and/or z axes. Operation of the movement subsystem 1330, radiation source 1310, and fluidic subsystem 1320 are controlled by an electronic control system 1340 which may include a microprocessor implementing program instructions stored in memory. Under program control, the ejector system 1300 may be configured to produce three dimensional objects by ejecting layer after layer of the ejectable material according to a predetermined pattern. The pattern may be digitally stored and accessed by the electronic control system 1340.

Figure 14:
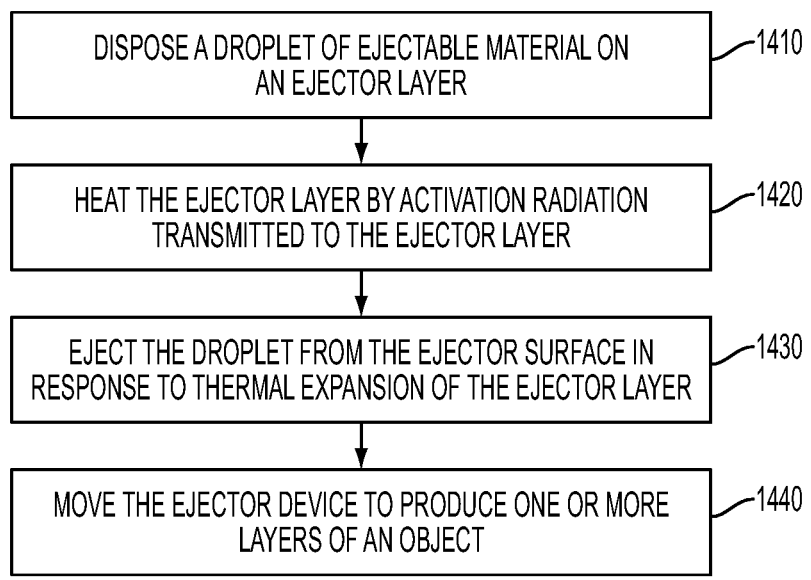
FIG. 14 is a flow diagram illustrating an ejection process.

FIG. 14 is a flow diagram illustrating a method of using the ejector device and/or system discussed above. A droplet of ejectable material is disposed 1410 on an ejector surface of an ejector layer. The ejector layer is heated 1420 by activation radiation such as by absorption of a laser pulse. The heating causes the ejector layer to thermally expand without phase transition. In response to the thermal expansion of the ejector layer, the droplet of material is ejected 1430 from the ejector surface. The ejector device may be moved 1440 along and/or around x, y, and/or z axes to form one or more layers of a 2D or 3D object.

Embodiments discussed herein involve fabrication of a structure which is heated by laser pulse absorption and driven to deform due to thermal stresses at a rate high enough to eject a layer of ink. Using a bimorph or multimorph ejector layer can facilitate buckling above a stress threshold with predetermined directionality. Motion during buckling can be much faster than the average rate of change of the stress, thereby effectively increasing the momentum transfer to the ejectable material.

In some configurations, the ejector device can be fabricated using photolithography optionally using at least one layer of sacrificial material. In some configurations, two or more layers of sacrificial material with different etching properties can be used for more complex ejector layer shapes. For example, a sacrificial mesa can be created with various structures such as hemispherical caps along the length of the mesa. Fabrication of the ejector device can involve deposition and patterning of the one or more sacrificial layers on a radiation transparent substrate such as glass. Alternatively the mesas can be deposited through a contact mask. After patterning of the mesas, a conformal transparent layer can be deposited followed by a highly absorbing layer to form a bimorph, or in some implementations, just the absorbing layer is deposited if a non-buckling ejector layer provides sufficient ink acceleration. In the bimorph embodiment, the absorbing layer should also have a higher thermal expansion coefficient than that of the transparent layer. Various parameters, such as layer/sublayer thicknesses, layer stiffnesses, etc. can be selected to provide a specified momentum transferable to an overlying bio-ink droplet. The surface energy of the top layer of the ejector layer, either the absorbing sublayer itself or a third sublayer (such as silicone) may be chosen to provide a specified surface energy to bind the ink droplet to the ejector surface of the ejector layer.

In a subsequent processing step an aperture structure can be attached to the tops of some of the mesas so that the aperture structures overhang partially the spaces on both sides of these mesas. The aperture structures are used in operation to confine the ink. Either before or after fabrication of the aperture structures, the sacrificial material within the ejector mesa can be etched away, e.g., either from the ends of the ejector mesas or through vias formed in the substrate. The ejector mesa so formed is able to provide multiple thermo-expansive and/or buckling ink ejectors.

In some embodiments, the ejector mesa which includes one or more hollow areas can be fabricated with solid neighboring mesas. The solid neighbors act as anchors to stiffen the buckling or distorting structures. In some embodiments, a thermally conductive layer can be deposited, for example, along the bottom of the ink channel (and optionally partially or fully up the side wall of the mesas) to facilitate heat removal and spreading from the illuminated ejectors.

In operation, ink is first pressurized to overtop the ejector mesa then depressurized to leave behind an isolated top coat of ink (droplet) on the ejector mesa. Light is focused onto the absorbing layer of a given ejector, inducing heating, thermal expansion and buckling of the local bimorph or thermal expansion defined by a built-in convexity.

Systems, devices, and/or methods disclosed herein may include one or more of the features, structures, processes, or combinations thereof described herein. For example, a device or method may be implemented to include one or more of the features and/or processes described herein. It is intended that such device or method need not include all of the features and/or processes described herein, but may be implemented to include selected features and/or processes that provide useful structures and/or functionality.

In the above detailed description, numeric values and ranges are provided for various aspects of the implementations described. These values and ranges are to be treated as examples only, and are not intended to limit the scope of the claims. For example, embodiments described in this disclosure can be practiced throughout the disclosed numerical ranges. In addition, a number of materials are identified as suitable for various implementations. These materials are to be treated as exemplary, and are not intended to limit the scope of the claims.

The foregoing description of various embodiments has been presented for the purposes of illustration and description and not limitation. The embodiments disclosed are not intended to be exhaustive or to limit the possible implementations to the embodiments disclosed. Many modifications and variations are possible in light of the above teaching.

The invention claimed is:

1. An ejector device for ejecting droplets of viscous fluids, comprising:
   one or more ejectors comprising an ejector layer that spans a hollow area, the ejector layer having a first surface and an opposing second surface arranged to receive a viscous material with viscosity between 20 and 50,000 centipoise, the ejector layer comprising a radiation absorber material configured to thermally expand without phase transition in response to heating by activation radiation transmitted to the first surface, the ejector layer comprises multiple layers including a first layer having a first coefficient of thermal expansion, CTE1, and a second layer having a second coefficient of thermal expansion, CTE2, wherein CTE2>CTE1, wherein thermal expansion of the ejector layer causes displacement of the ejector layer and ejection of the material from the second surface of the ejector layer.

2. The device of claim 1, wherein the one or more ejectors comprise an array of ejectors.

3. The device of claim 2, wherein the array is a one dimensional array that includes one or more hollow mesas.

4. The device of claim 2, wherein the array is a two dimensional array that includes one or more hollow islands.

5. The device of claim 1, further comprising:
   a substrate;
   one or more mesas disposed on the substrate, at least one of the mesas being an ejector mesa comprising the ejector layer that spans the hollow area; and
   at least one channel disposed adjacent to at least one of the one or more mesas, the channel configured to carry the material to the ejectors.

6. The device of claim 5, wherein the substrate comprises at least one of:
   a material that is transparent at wavelengths of the activation radiation; and
   one or more vias through the substrate.

7. The device of claim 5, wherein the one or more ejectors comprise one or more hollow mesas, each of the one or more hollow mesas disposed between and bonded to solid mesas.

8. The device of claim 7, wherein the ejector layer includes at least one layer that conforms to the channel and walls of the solid mesas.

9. The device of claim 5, further comprising a thermally conductive layer disposed at least partially along the channel.

10. The device of claim 5, wherein the substrate includes vias fluidically coupled to the channel.

11. The device of claim 5, further comprising an aperture layer disposed at least partially over the channel.

12. The device of claim 1, wherein the absorption of the activation radiation in the second layer causes buckling of the ejector layer.

13. The device of claim 1, wherein the second layer comprises amorphous Ge or amorphous Si.

14. The device of claim 1, wherein at least one layer of the ejector layer comprises a binding material configured to provide a predetermined surface energy.

15. The device of claim 1, wherein a portion of the ejector layer, when unheated, is convex and bends toward the substrate.

16. The device of claim 1, wherein the ejector layer has a built in stress gradient.

* * * * *